(12) United States Patent
Chen et al.

(10) Patent No.: US 7,813,126 B2
(45) Date of Patent: Oct. 12, 2010

(54) PLATE COMBINATION TYPE COMPUTER HOUSING

(75) Inventors: Bao-Hung Chen, Taipei Hsien (TW); Chun-Chang Lai, Taipei Hsien (TW)

(73) Assignee: Aopen Inc., Hsichi, Taipei Hsien (TW)

(*) Notice: Subject to any disclaimer, the term of this patent is extended or adjusted under 35 U.S.C. 154(b) by 324 days.

(21) Appl. No.: 11/907,956

(22) Filed: Oct. 18, 2007

(65) Prior Publication Data

US 2008/0316699 A1 Dec. 25, 2008

(30) Foreign Application Priority Data

Jun. 22, 2007 (TW) .............................. 96210127 U

(51) Int. Cl.
*G06F 1/16* (2006.01)
*A47B 96/00* (2006.01)
*A47G 29/00* (2006.01)

(52) U.S. Cl. .............................. 361/679.6; 361/679.02; 248/223.31; 248/223.41; 312/265.6; 312/223.2; 206/320

(58) Field of Classification Search ................................. 361/679.01–679.61, 725, 726, 732, 683; 454/184; 312/236, 223.1, 223.2, 265.1–265.6, 312/257.1, 263, 264; 248/27.1, 223.31, 223.41
See application file for complete search history.

(56) References Cited

U.S. PATENT DOCUMENTS

| 6,166,910 | A * | 12/2000 | Ronberg et al. | 361/724 |
| 2004/0190270 | A1* | 9/2004 | Aldag et al. | 361/752 |
| 2006/0084375 | A1* | 4/2006 | Chang | 454/184 |
| 2007/0133161 | A1* | 6/2007 | Lin | 361/683 |

* cited by examiner

*Primary Examiner*—Zachary M Pape
*Assistant Examiner*—Jerry Wu

(57) ABSTRACT

A plate combination type computer housing comprises a bottom plate, a first plate, a second plate, a third plate, a fourth plate, a upper plate and four fixing rods. Whereby, the number of molds for manufacturing the housing can be reduced so as to save the production cost, and it is unnecessary to process screw locking to allow the four fixing rods to be respectively coupled to the first plate, the second plate, the third plate and the fourth plate such that the assembly is easier to reduce the assembly time substantially and hence, no screws and no fixing rods are exposed outside the computer housing to influence the modeling design of an outlook of the computer housing.

3 Claims, 6 Drawing Sheets

PLATE COMBINATION TYPE COMPUTER HOUSING

BACKGROUND OF THE INVENTION

1. Field of the Invention

The present invention relates to a computer housing, and more particularly to a combination type computer housing.

2. Description of Related Art

A computer housing is used for accepting electronic components such as mother board, hard disk drive, CD-ROM drive and power supply. General computer housings mostly are fixed type structures, and there are also structures allowing the computer housing to be detached into a few parts and combine them together to form the entirety, for example, a flat type computer assembling structure disclosed in Taiwan Patent No. M263722 and a combination type computer mainframe box disclosed in Taiwan Patent No. M290265, in which the combination type computer mainframe box comprises at least three connection seats, a plurality of side wall components, a bottom plate and a upper cover, in which a retaining wall is respectively disposed on at least two sides of each combination seat and fixing holes are respectively disposed on upper and lower ends of each retaining wall and each combination seat; fixing holes are respectively disposed on two ends of each side wall component so as to be correspondingly locked to opposite retaining walls of the two connection seats; the bottom plate is coincided with an outlook shape of an area surrounded by the retaining walls of the connection seats and straddled across to lock onto a bottom of each connection seat, in which a plurality of fixing holes are disposed on the bottom plate so as to allow devices needed to assemble to be locked thereon;, the upper cover is coincided with the outlook shape of the area surrounded by the retaining walls of the connection seats and straddled across to lock onto a top of each connection seat. Whereby, each connection seat, the side, walls, the bottom and the upper covers are used as surrounding frames to form a computer mainframe box with an accepting space.

The connection seats are respectively disposed on four corners of the combination type computer mainframe box mentioned above and the side walls are locked between the two connection seats through screws; it rather wastes time on the assembly. Besides, the four connection seats and even the locking screws of the side walls included are exposed outside the box; it will influence the modeling design of the outlook of the box.

Furthermore, U.S. patent application Ser. No. 11/655,278 discloses a computer housing structure detachable into plates and easier to be assembled constituted by a upper cover, lower cover, front wall, rear wall, mainframe plate retaining wall, first supporting frame, second supporting frame, connection rack, third supporting frame, left side plate, right side plate and panel, all components are plates and formed into a packing body with reduced volume after being collected together thereby a space occupied by the computer housing can be reduced substantially while being stored or transported so as to be beneficial for decreasing the transportation cost and saving the storing space.

However, the computer housing detachable into plates and easy to be assembled mentioned above is suitable for a large scale desktop computer housing, but rather not suitable for the current mini-type computer housing.

SUMMARY OF THE INVENTION

For allowing a mini type computer housing to have the smallest volume after being collected so as to be more beneficial for lowering the transportation cost and saving the storage space, the present invention is proposed.

The main object of the present invention is to provide a plate combination type computer housing, allowing all components to be collected into a packed body with a small volume and be beneficial for decreasing the transportation cost and saving the storage space.

Another object of the present invention is to provide a plate combination type computer housing, provided with a simple six-plates type components and four fixing rod and capable of reducing the number of molds for manufacturing the housing so as to save the production cost and be easier to be assembled.

The plate combination type computer housing according to the present invention is adapted to effectively reduce a volume of a packed computer housing and convenient for on the assembly, comprising:

a bottom plate;

four fixing rods, respectively coupled to the bottom plate and positioned on four corners of the bottom plate;

a first plate, two ends thereof being respectively provided with a first coupling portion and a second coupling portion respectively coupled to the two fixing rod position at a front end of the bottom plate;

a second plate, two ends thereof being respectively provided with a first coupling portion and a second coupling portion respectively coupled to the two fixing rod position at a first side end of the bottom plate;

a third plate, two ends thereof being respectively provided with a first coupling portion and a second coupling portion respectively coupled to the two fixing rod position at a second side end of the bottom plate;

a fourth plate, two ends thereof being respectively provided with a first coupling portion and a second coupling portion respectively coupled to the two fixing rod position at a rear end of the bottom plate; and an upper plate, four corners at a downside thereof being respectively coupled to the fixing rods;

wherein outer sides of the four fixing rods are respectively shielded by the pair wise adjacent first plate, the second plate, the fourth plate and the third plate, the number of molds for manufacturing housing can be reduced so as to save the production cost, screws are unnecessary to be used for locking the four fixing rods respectively to the first plate, the second plate, the third plate and the fourth plate to assemble them together more easily so as to be able to save the assembly time in a large scale and hence, screws and the fixing rods are not exposed outside the computer housing to influence the modeling design of the outlook modeling.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
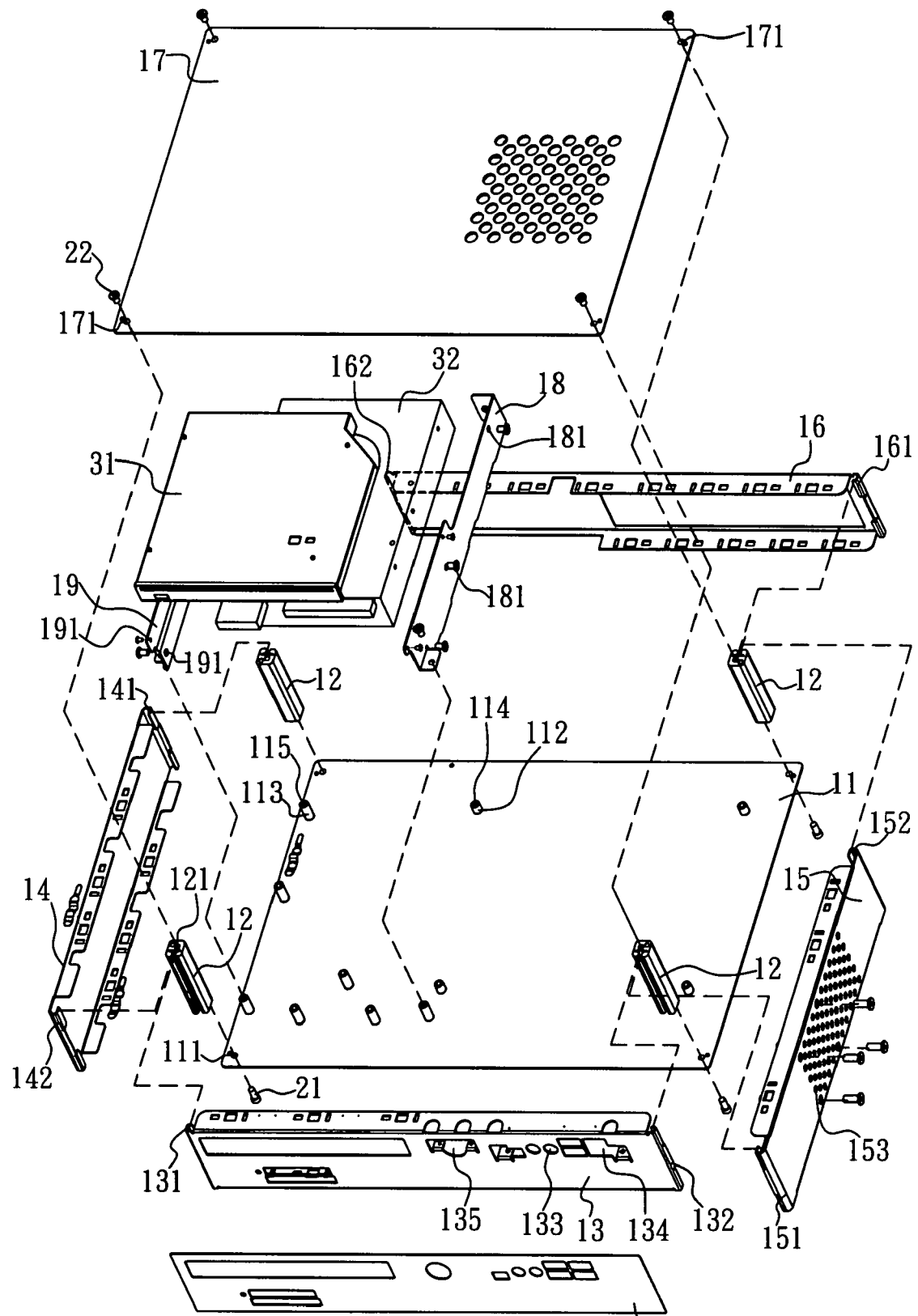
FIG. 1 is a schematically exploded view, showing a computer housing of a first preferred embodiment according to the present invention.
Figure 2:
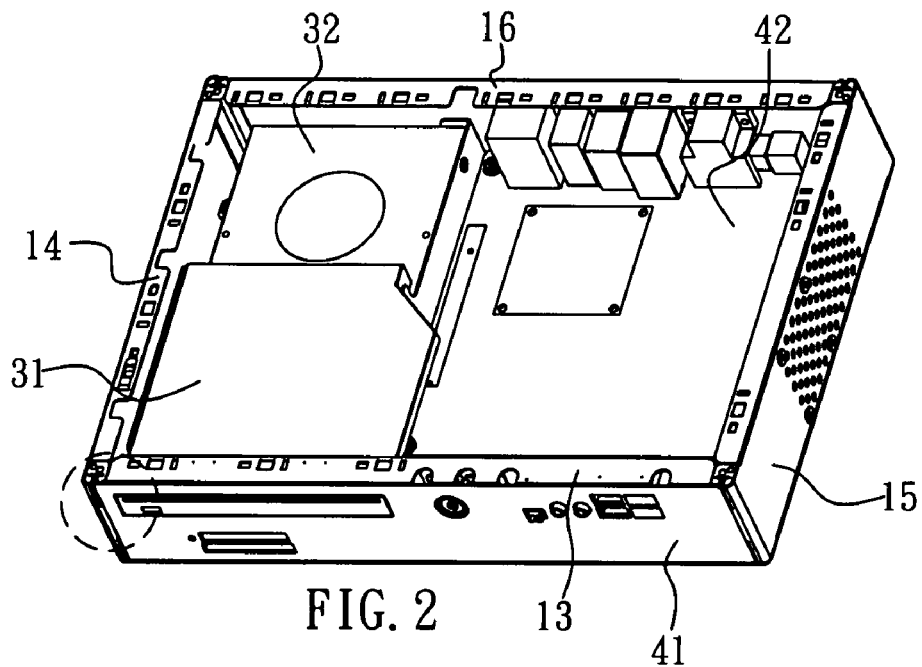
FIG. 2 is a schematically perspective view, showing the computer housing of the first preferred embodiment according to the present invention in which the housing is not coupled to a upper plate.
Figure 3:
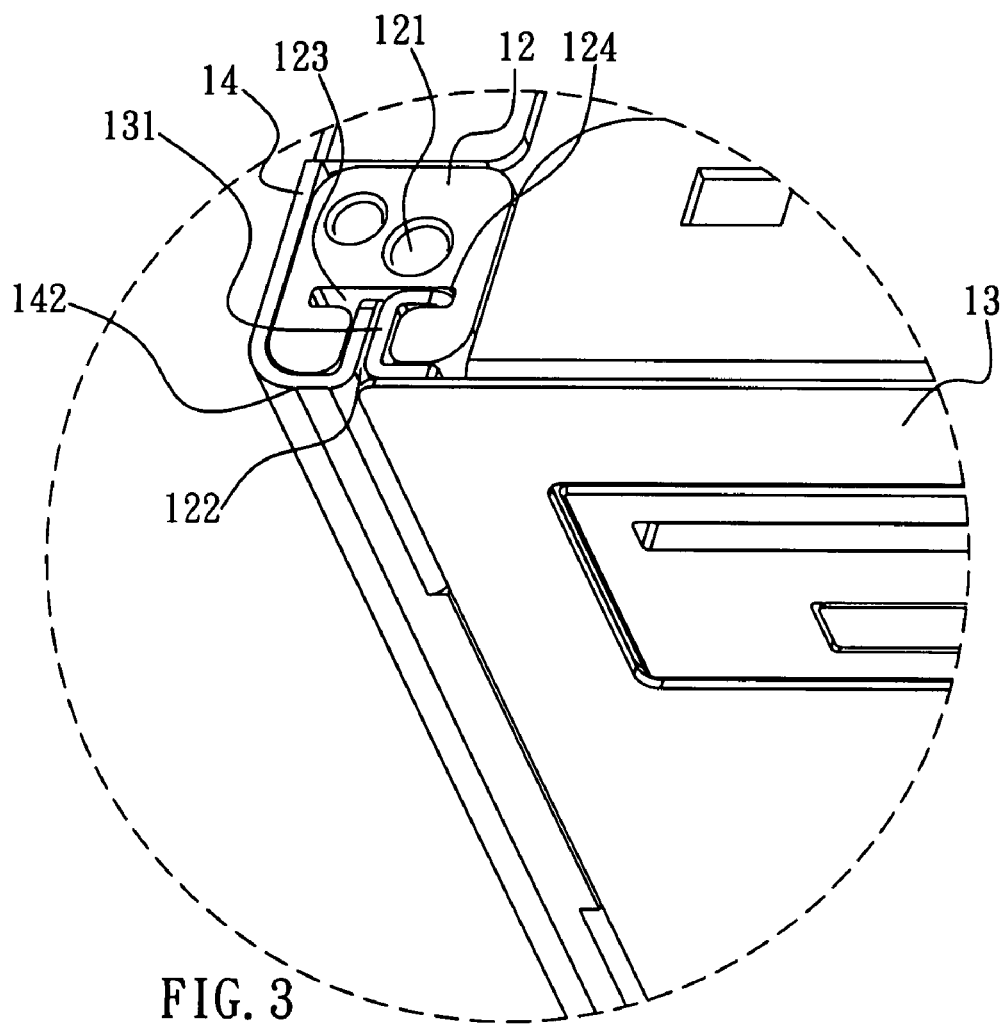
FIG. 3 is a locally enlarged view, showing a fixing rod shown in FIG. 2 in which the fixing rod is coupled to a first plate and a second plate.

Please refer to FIGS. 1 to 4. A plate combination type computer housing according to the present invention is adapted to effectively reduce a volume of a computer housing while being packed. A computer housing of a first preferred embodiment according to the present invention comprises a bottom plate 11, four fixing rods 12, a first plate 13, a second plate 14, a third plate 15, a fourth plate 16, an upper plate 17, a first supporting frame 18, a second supporting frame 19 and a panel 41. A hole 111 is disposed on each corner of the bottom plate 11; a plurality of first raised columns 112 and a plurality of second raised columns 113 are coupled to an upside of the bottom plate 11. Screw holes 114 and 115 are respectively disposed on upper ends of each first raised column 112 and each second column 113. As FIG. 3 shows, upper and lower ends of the fixing rod 12 are respectively provided with a screw hole 121 and a first column type groove 122 and a second column type groove 123 are disposed on the fixing rod 12 and extended longitudinally up to the upper and the lower ends thereof. A first end of a cross section of the first column type groove 122 is communicated with the outside of the fixing rod 12 and a second end thereof is communicated with a middle section of the second column type groove 123; a cross section of the second column type groove 123 is long-strip type. As FIG. 1 shows, four screws 21 are respectively passed through the holes 111 of the bottom plate 11 to screw into the screw holes on lower ends of the fixing rods 12 to enable the four fixing rods 12 to be respectively coupled to the upsides of the four corners of the bottom plate 11. First coupling portions 131, 141, 151 and 161 and second coupling portions 132, 142, 152 and 132 have a "U"-shaped bend respectively disposed on two ends of the first plate 13, the second plate 14, the third plate 15 and the fourth plate 16; the first coupling portions 131, 161 and the second coupling portions 132, 162 of the two ends of the first plate 13 and the fourth plate 16 are respectively engaged within the corresponding first column type grooves 122 and second column type grooves 123 of each two fixing rods 12 positioned on the front and the rear ends of the bottom plate 11, and end portions of the first coupling portions 131, 161 and end portions of the second coupling portion 132, 162 are respectively engaged with side ends 124 of the second column type grooves 123 to allow the first coupling portions 131, 161 and the second coupling portions 132, 162 to be respectively buckled in two half-disposed "U"-shaped grooves formed by the first column type groove 122 and the second column type groove 123 and unable to be moved forward or rearward to separate from the two fixing rods 12 so that the first plate 13 and the fourth plate 16 are respectively coupled to the front sides and the rear sides of the fixing rods 12 disposed at two ends of the first plate 13 and the fourth plate 16.

Figure 4:
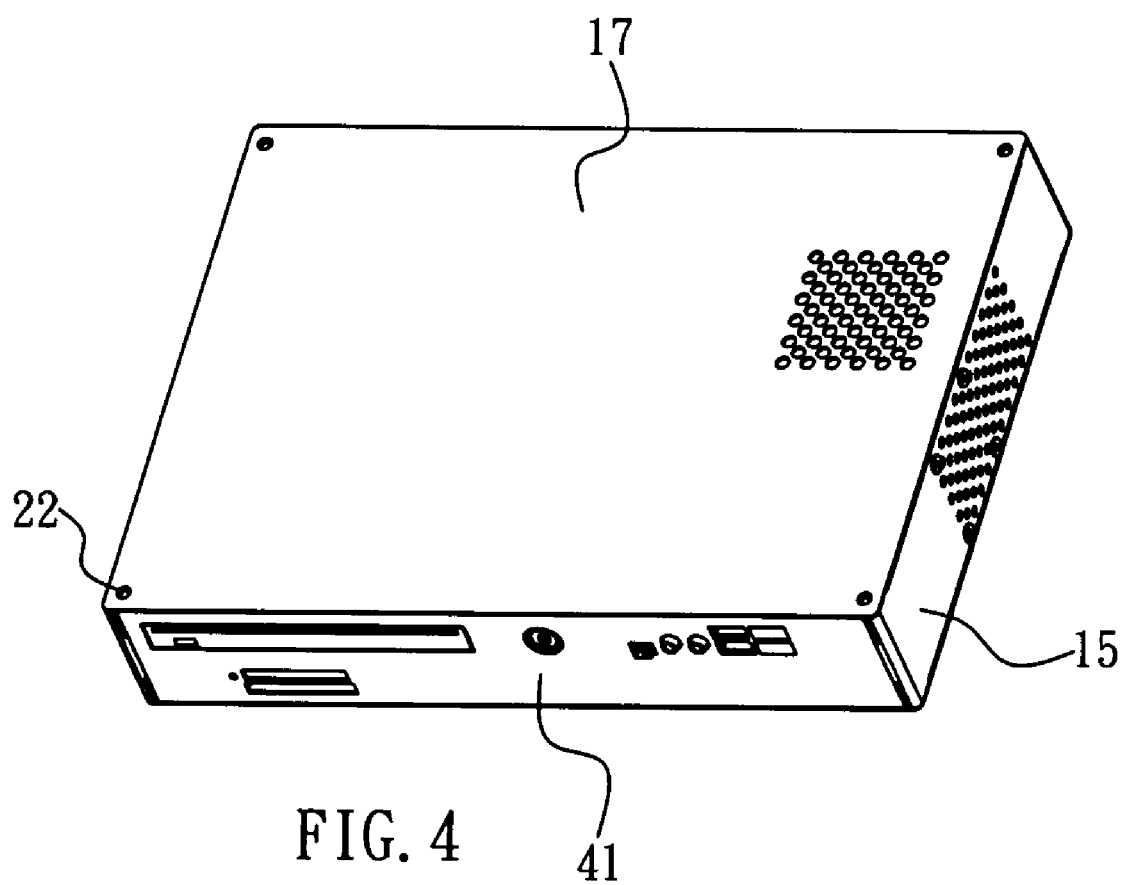
FIG. 4 is schematically perspective view, showing the computer housing of the first preferred embodiment according to the present invention.

The first coupling portions 141, 151 and the second coupling portions 142, 152 of the two ends of the second plate 14 and the third plate 15 are respectively engaged within the corresponding first column type grooves 122 and second column type grooves 123 of each two fixing rods 12 positioned on the first and the second side ends of the bottom plate 11 to allow the first coupling portions 141, 151 and the second coupling portions 142, 152 not to be moved leftward or rightward so as to enable the second plate 14 and the third plate 15 to be respectively coupled to the first sides and the second sides of the fixing rods 12 disposed at two ends of the second plate 14 and the third plate 15. The two ends of the first plate 13 and the fourth plate 16 are respectively adjacent to the two ends of the second plate 14 and the third plate 15 such that outer sides of the fixing rods 12 are respectively shielded. For example, as FIG. 3 shows, the first coupling portion 131 of the first plate 13 is engaged within the first column type groove 122 and a half of the second column type groove 123 of the fixing rod 12 to cause the first coupling portion 131 not to be moved frontward or rearward to separate from the fixing rod 12; the second coupling portion 142 of the second plate 14 is engaged within the first column type groove 122 and a middle section of the second column type groove 123 to cause the second coupling portion 142. not to be moved leftward or rightward to separate from the fixing rod 12 Besides, the first coupling portion 131 and the second coupling portion 142 cover the outer side of the fixing rod 12 to enable the fixing portion 12 not to be exposed outside the computer housing. The screw holes 114 of the first raised columns 112 are used for coupling to a mother board 42 through screws as FIG. 3 shows. A plurality of screw holes 115 of the second raised columns 113 are used for respectively coupling to the first supporting frame 18 and the second supporting frame 19 through screws. The first supporting frame 18 and the second supporting frame 19 are respectively provided with holes 181 and 191 corresponding to screw holes of a CD-ROM drive 31 and a hard disc drive 32 to use for fixedly coupling to the CD-ROM drive 31 and the hard disc drive 32 through screws as FIG. 2 shows. Furthermore, as FIG. 1 shows, a screw hole 171 is disposed on each corner of the upper plate 17 and a plurality of screws 22 are allowed to respectively pass through the holes 171 to engage with the screw holes 121 on upper ends of the fixing rods 12 to enable the upper plate 17 to be fixedly coupled onto the upper ends of the four fixing rods 12 to complete the computer housing assembly as FIG. 4 shows. As FIG. 1 shows, the first plate 13 is provided with a plurality of open holes 133, 134 and 135 used for respectively coupling to external panel buttons or external receptacles. A panel 41 is coupled to a front side of the first plate 13. The third plate 15 is provided with a plurality of open holes 153 used for fixing a fan through screws or guiding air.

Figure 5:
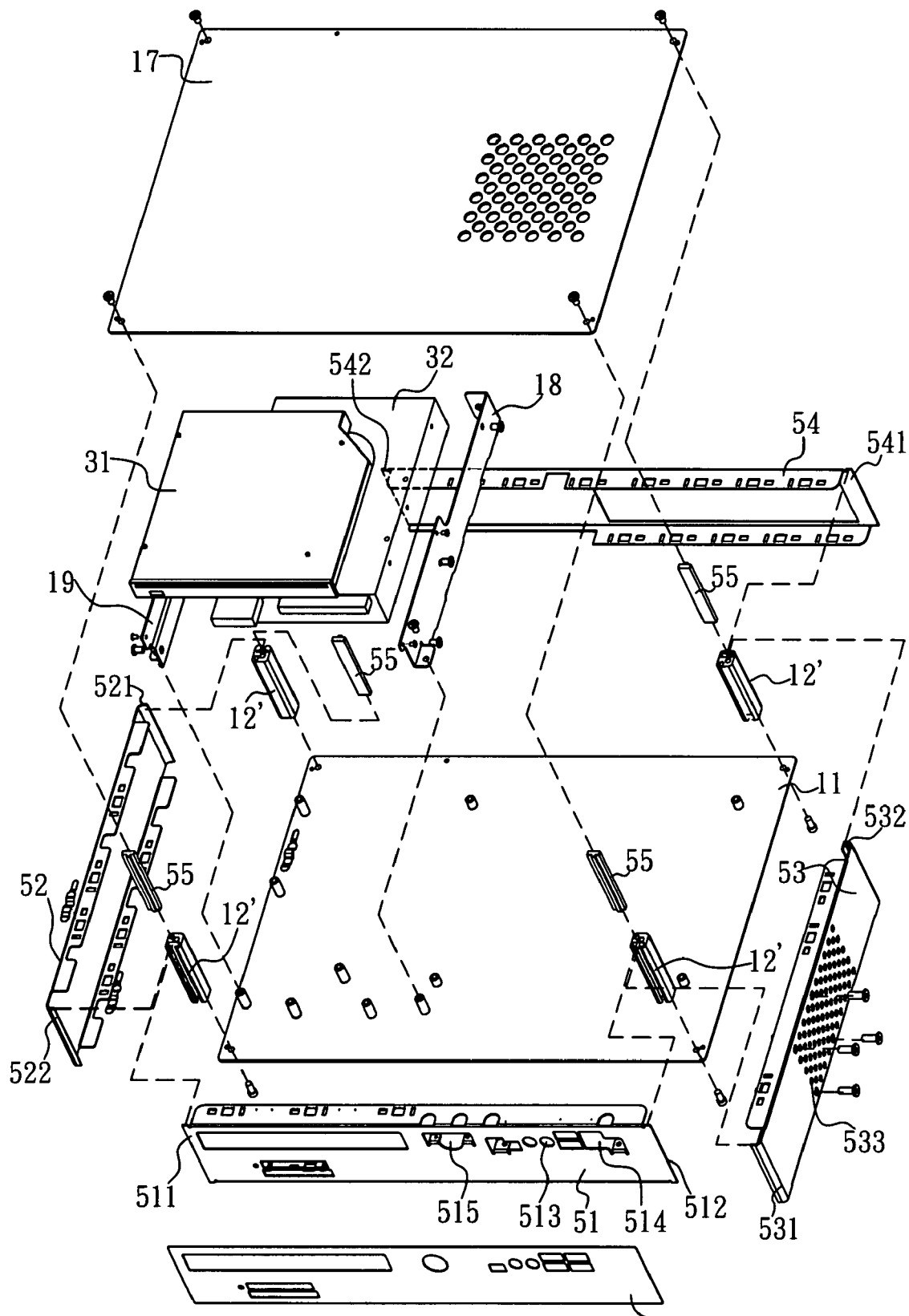
FIG. 5 is a schematically exploded view, showing a computer housing of a second preferred embodiment according to the present invention.
Figure 6:
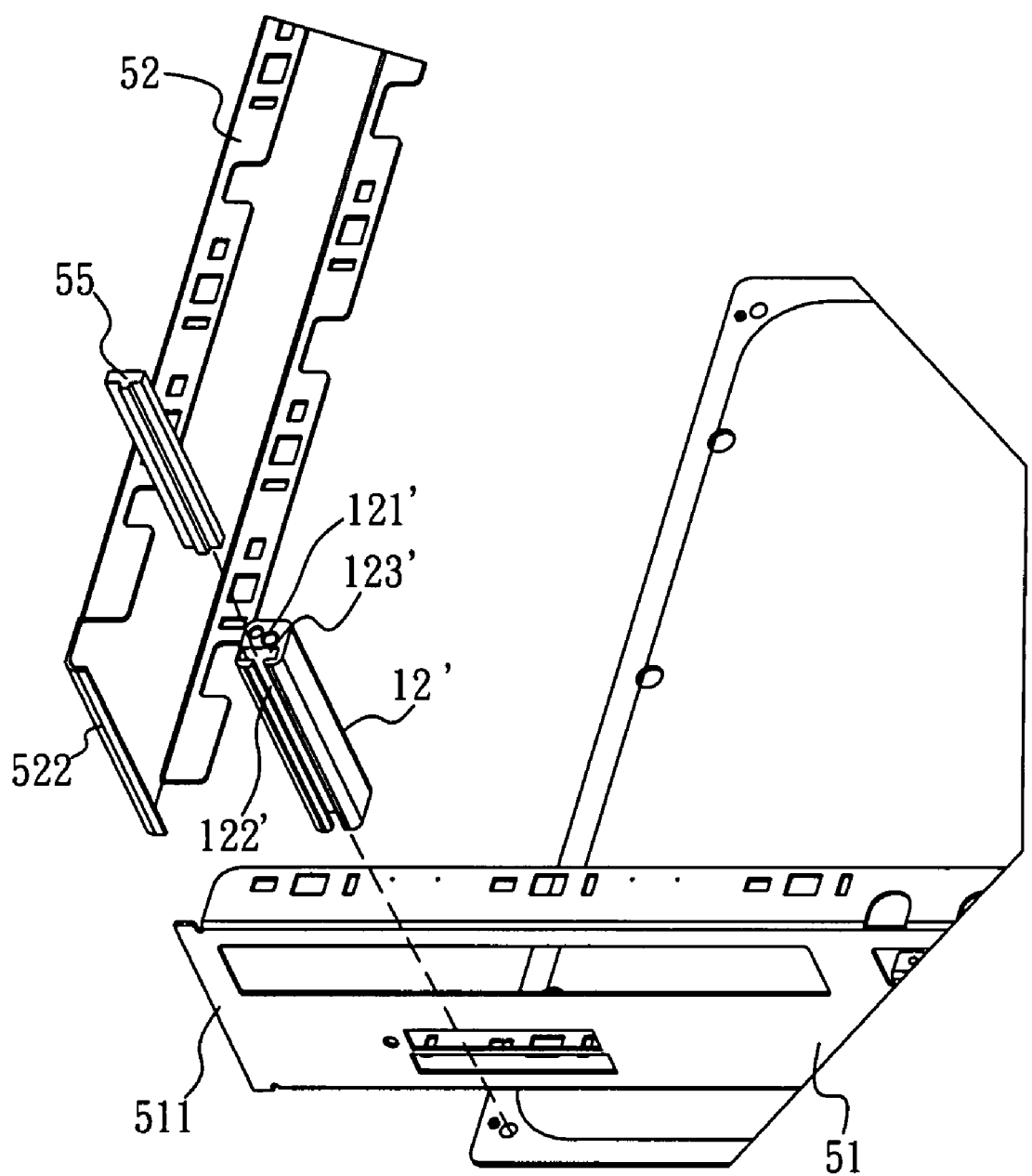
FIG. 6 is a schematic view, showing a fixing rod of the computer housing of the second preferred embodiment according to the present invention in which the fixing rod is not coupled to the first plate and the second plate.

Please refer to FIGS. 1 and 5. A computer housing of a second preferred embodiment according to the present invention comprises a bottom plate 11, four fixing rods 12', a first plate 51, a second plate 52, a third plate 53, a fourth plate 54, a upper plate 17, a first supporting frame 18, a second supporting frame 19, four column type magnets 55 and a panel 41.

The computer housing of the second embodiment and the computer housing of the first embodiment are provided with the same bottom plate 11, four fixing rods 12', upper plate 17, first supporting frame 18, second supporting frame 19 and panel 42, and the coupling structures of the components are approximately the same; the fixing rod 12' is also provided with screw holes 121', a first column type groove 122' and a second column type groove 123'. But, the cross sections of the first column type groove 122' and the second column type groove 123' are wider to be used for accepting the column type magnet 55; first coupling portions 511, 541 and second coupling portions 512, 542 on two ends of the first plate 51 and the fourth plate 54 of the computer housing of the second embodiment all are a plain plate type and are not bended to be "U" type; first coupling portions 521, 531 and second coupling portions 522, 532 on two ends of the second plate 52 and the third plate 53 all are bended to be "L" type to cover one corner of the fixing rod 12' and not bended to be "U" type; the first panel 51 is also provided with a plurality of open holes 513, 514 and 515 used for respectively coupling to external panel buttons or external receptacles; the third plate 53 is also provided with a plurality of open holes 533 used for allowing screws to fix a fan or guiding air. Furthermore, the computer housing of the second embodiment further comprises four column type magnets 55 respectively accepted in accepting spaces constituted by the first column type grooves 122' and the second column type grooves 123' of the four fixing rods 12'. The four fixing rods 12', the first plate 51, the second plate 52, the third plate 53 and the fourth plate 54 are all made from iron material and have iron ingredients.

Figure 7:
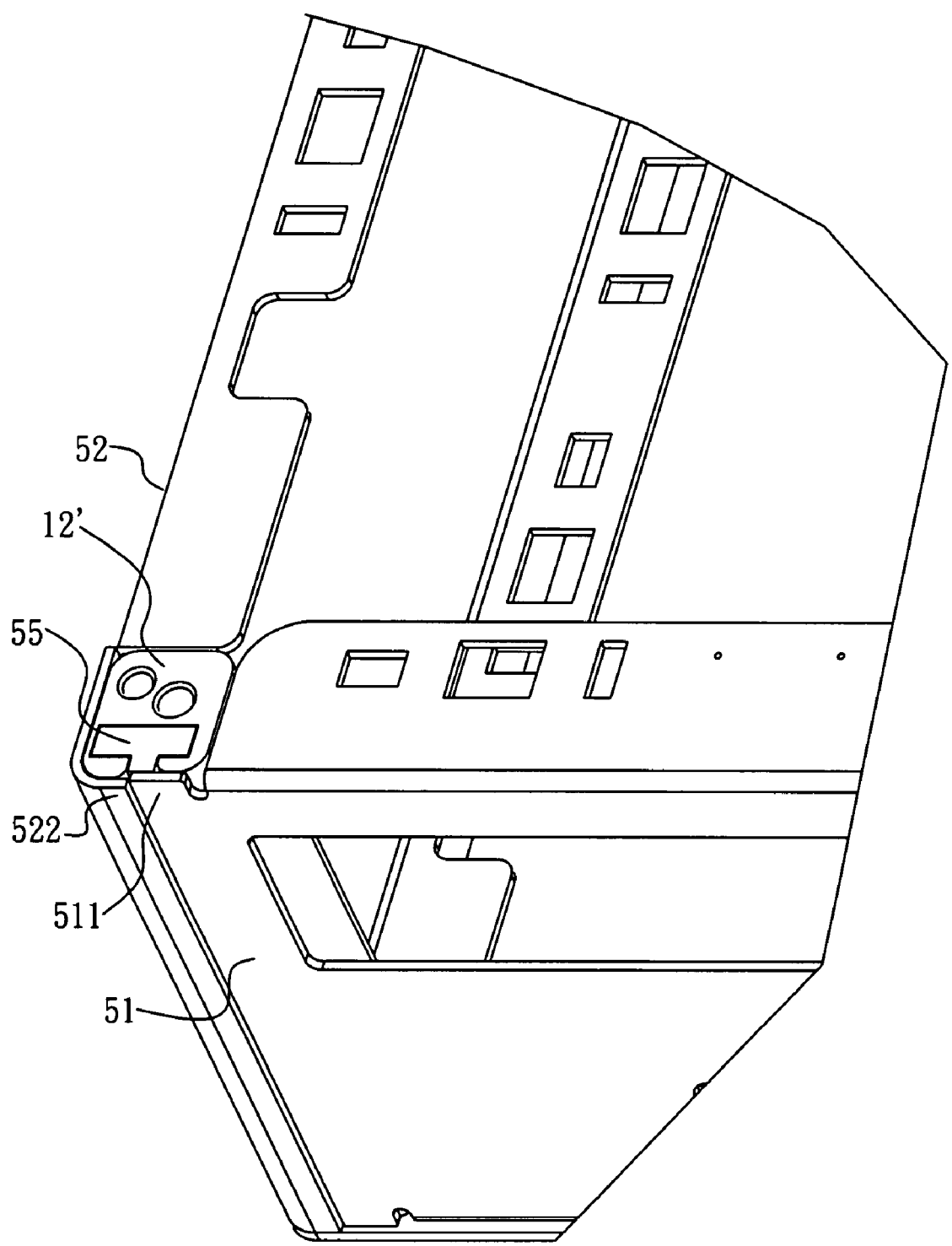
FIG. 7 is a schematic view, showing a fixing rod of the computer housing of the second preferred embodiment according to the present invention in which the fixing rod is coupled to the first plate and the second plate.

As to the computer housing of the second embodiment according to the present invention, the four fixing rods 12' are allowed to respectively attract the first coupling portions 511, 521, 531, 541 and the second coupling portions 512, 522, 532, 542 of the first plate 51, the second plate 52, the third plate 53 and the fourth plate 54 by means of magnetic attraction force of the column type magnets 55 to complete the computer housing assembly operation easier. As FIG. 7 shows, take the structure of coupling the first coupling portion 511 of the first plate 51 and the second coupling portion 522 of the second plate 52 to an outer side of the fixing rod 12' as an example to explain. When the column type magnet 55 is accepted in the accepting space constituted by the first column type groove 122' and the second column type groove 123' of the fixing rod 12', it leads to that the fixing rod 12' is also provided with attraction force by means of the magnetic force of the column type magnet 55 so that the outer side of the fixing rod 12' can respectively attract the first coupling portion 511 of the first plate 51 and the second coupling portion 522 of the second plate 52 to enable the first coupling portion 511 and the second coupling portion 522 to respectively cover the outer side of the fixing rod 12'.

When the components of the plate combination type computer housing of the present invention are not assembled together, they all very easy to be collected into a packing body with the smallest volume because they are all plates. Whereby, the space occupied by the computer housing can substantially be reduced when they are stored or transported to be beneficial for reducing the transportation cost and saving the storage space.

The plate combination type computer housing of the present invention is provided with simple six-plates type components and four fixing rods such that the number of molds for manufacturing the housing can be reduced to save the production cost. Besides, it is unnecessary to process screw locking to enable the four fixing rods to be respectively coupled to the first plate, the second plate, the third plate and the fourth plate so that the assembly is easier to substantially reduce the assembly time and the modeling design of the outlook of the computer housing is not influenced because there are no screws and fixing rods to be exposed outside the computer housing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plate combination type computer housing, adapted to effectively reduce a volume of the computer housing while being packed and be convenient for assembly, comprising:
   a bottom plate;
   four fixing rods, respectively coupled to said bottom plate and positioned on four corners of said bottom plate;
   a first plate, two ends thereof being respectively provided with a first coupling portion and a second coupling portion respectively coupled to two said fixing rods positioned on a front end of said bottom plate;
   a second plate, two ends thereof being respectively provided with a first coupling portion and a second coupling portion respectively coupled to two said fixing rods positioned on a first side end of said bottom plate;
   a third plate, two ends thereof being respectively provided with a first coupling portion and a second coupling portion respectively coupled to two said fixing rods positioned on a second side end of said bottom plate;
   a fourth plate, two ends thereof being respectively provided with a first coupling portion and a second coupling portion respectively coupled to two said fixing rods positioned on a rear end of said bottom plate; and
   an upper plate, four corners of a downside thereof being respectively coupled to said fixing rods;
   wherein outer sides of said four fixing rods are respectively shielded by said pairwise adjacent first plate, second plate, fourth plate and third plate;
   wherein said fixing rod is provided with a column type groove longitudinally extended up to upper and lower ends thereof; an end portion of said first coupling portion and an end portion of said second coupling portion are respectively engaged within said column type groove;
   wherein said column type groove comprises a first column groove and a second column type groove, a first end of a cross section of said first column type groove is communicated with an outside of said fixing rod, and a second end thereof is communicated with said second column groove;
   wherein said second end of said cross section of said first column type groove is communicated with a middle section of said second column type groove.

2. The computer housing according to claim 1, wherein said cross section of said second column type groove is long strip type.

3. The computer housing according to claim 2, wherein said first coupling portion and said second coupling portion respectively are "U"-shaped; said first coupling portion and said second coupling portion of said first plate and said first coupling portion and said second coupling portion of said fourth plate are respectively engaged within said corresponding first column type groove and second column type groove of said fixing rod, and end portions of said first coupling portion and said second coupling portion are respectively engaged with one side end of said second column type groove; said first coupling portion and said second coupling portion of said second plate and said first coupling portion and said second coupling portion of said third plate are respectively engaged within said corresponding first column type groove and second column type groove of said fixing rod.

* * * * *